US006045116A

United States Patent [19]

Willke et al.

[11] Patent Number: 6,045,116

[45] Date of Patent: Apr. 4, 2000

[54] ELECTROMAGNETICALLY OPERATED VALVE

[75] Inventors: Clemens Willke, Oberstenfeld; Jürgen Graner, Sersheim; Dieter Maier, Gerlingen, all of Germany

[73] Assignee: Robert Bosch GmbH, Stuttgart, Germany

[21] Appl. No.: 09/194,269

[22] PCT Filed: Jan. 9, 1998

[86] PCT No.: PCT/DE98/00052

§ 371 Date: Apr. 29, 1999

§ 102(e) Date: Apr. 29, 1999

[87] PCT Pub. No.: WO98/42976

PCT Pub. Date: Oct. 1, 1998

[30] Foreign Application Priority Data

Mar. 26, 1997 [DE] Germany ........................... 197 12 590

[51] Int. Cl.$^{7}$ ...................................................... F16K 31/02

[52] U.S. Cl. ................................. 251/129.21; 239/585.1; 239/900

[58] Field of Search .................... 251/129.21; 239/585.1, 239/585.3, 585.4, 585.5, 900

[56] References Cited

U.S. PATENT DOCUMENTS

| | | | |
|---|---|---|---|
| 4,483,485 | 11/1984 | Kamiya et al. . | |
| 4,564,145 | 1/1986 | Takada et al. . | |
| 4,643,359 | 2/1987 | Casey . | |
| 4,967,966 | 11/1990 | Babitzka et al. . | |
| 5,820,031 | 10/1998 | Reiter et al. | 251/129.21 X |
| 5,823,446 | 10/1998 | Bennett et al. | 239/900 X |

FOREIGN PATENT DOCUMENTS

| | | |
|---|---|---|
| 38 31 196 | 3/1990 | Germany . |
| 40 08 675 | 9/1991 | Germany . |
| 195 03 224 | 8/1996 | Germany . |
| 62-087661 | 4/1987 | Japan . |

OTHER PUBLICATIONS

Patent Abstracts of Japan, vol. 11, No. 295 (M–626), Sep. 24, 1987.

*Primary Examiner*—Kevin Lee
*Attorney, Agent, or Firm*—Kenyon & Kenyon

[57] ABSTRACT

An electromagnetically actuated valve, includes an axially movable valve needle that includes at least one armature and one spherical valve-closure member. The armature forms a closing-member support, which receives the valve-closure member in a downstream end area. In this context, the end area encompasses the valve-closure member such that at least one channel, in direct connection with a longitudinal bore of the armature, is formed on the surface of the valve-closure member. The valve is well suited for use in fuel injection systems of mixture-compressing internal combustion engines having externally supplied ignition.

12 Claims, 2 Drawing Sheets

ELECTROMAGNETICALLY OPERATED VALVE

FIELD OF THE INVENTION

The present invention relates to an electromagnetically actuated valve.

BACKGROUND INFORMATION

A conventional electromagnetically actuatable valve is described in German Patent No. 38 31 196, in which a valve needle is composed of an armature, a tubular connecting part, and a spherical valve-closure member. The armature and the valve-closure member are joined to each other via the tubular connecting part, the connecting part acting as the immediate closing-member support, to which the valve-closure member is fixedly joined by a weld. The connecting part has a plurality of flow openings, through which the fuel can exit from an interior feed-through opening and, outside the connecting part, can flow to the valve-closure member, or to a valve seat surface which cooperates with the valve-closure member. In addition, the connecting tube has a longitudinal slot running over its entire length, through which, because of its large-surface hydraulic flow cross-section, fuel can flow very rapidly from the interior feed-through opening. The greater part of the fuel to be spray-discharged already flows out of the connecting part over its entire length, while a slight residual amount does not exit from the connecting part until it arrives at the spherical surface.

German Patent Application No. 195 03 224 describes an electromagnetically actuated injector, which has a valve needle whose closing-member support, which functions as the connecting part, is made of plastic. The spherical valve-closure member and the closing-member support are fixedly joined to each other by a snap-fit connection. In the closing-member support, a plurality of transverse openings are provided through which fuel can already exit from an interior opening, upstream of the valve-closure member. Then the fuel flows outside of and along the closing-member support in the direction of a valve seat surface, flowing through the molded flow paths on the outer periphery of the closing-member support shortly before arriving at the valve seat surface.

As described in German Patent Application No. 40 08 675, it is sufficiently well known to achieve fixed connections of individual components of valve needles in an integral manner, i.e., by welds.

SUMMARY OF THE INVENTION

The electromagnetically actuated valve of the present invention has the advantage that, in a particularly simple manner, it is cost-effective to manufacture. In this context, it is also advantageous that an extremely simple and cost-effective connection can be achieved between a closing-member support and a spherical valve-closure member. In this context, the closing-member support in its end area is configured for wrapping around the valve-closure member such that it forms one or a plurality of channels directly on the surface of the valve-closure member, through which fuel can flow unhindered from an interior longitudinal bore in the direction of a valve seat surface. In this way, with minimal manufacturing outlays, an optimal inflow to the dosing area of the valve is achieved. Unnecessary, in contrast to known valves, are now, on the one hand, transverse openings and slots in the closing-member support, and, on the other hand, polished sections on the valve-closure member or flow-through grooves in the valve seat body.

It is particularly advantageous to secure the valve-closure member at the closing-member support by means of a non-integral jointing method e.g., by means of pressing-in or flanging. It is then advantageous if the end area of the closing-member support extends in the upstream direction out beyond a spherical equator of the spherical valve-closure member.

In an advantageous manner, the armature can itself function directly as the closing-member support, so that, together with the valve-closure member, there is a two-part valve needle. A valve needle of this type can be manufactured particularly simply and cost-effectively, and, as a result of the reduced number of parts, it has only one single point of connection. The longitudinal bore of the armature is advantageously configured having flow paths which directly pass over into the channels in the end area of the closing-member support. Such flow paths and the channels can be shaped by broaching particularly effectively.

The armature can advantageously be executed as a cold-press part. Similarly, a connecting part functioning as a closing part carrier can be an extruded part. In the extrusion process, the recesses forming the channels in the end areas can be created very easily. The recesses no longer have to be deburred. The armature can advantageously be configured as a sintered or an MIM part.

DETAILED DESCRIPTION

Figure 1:
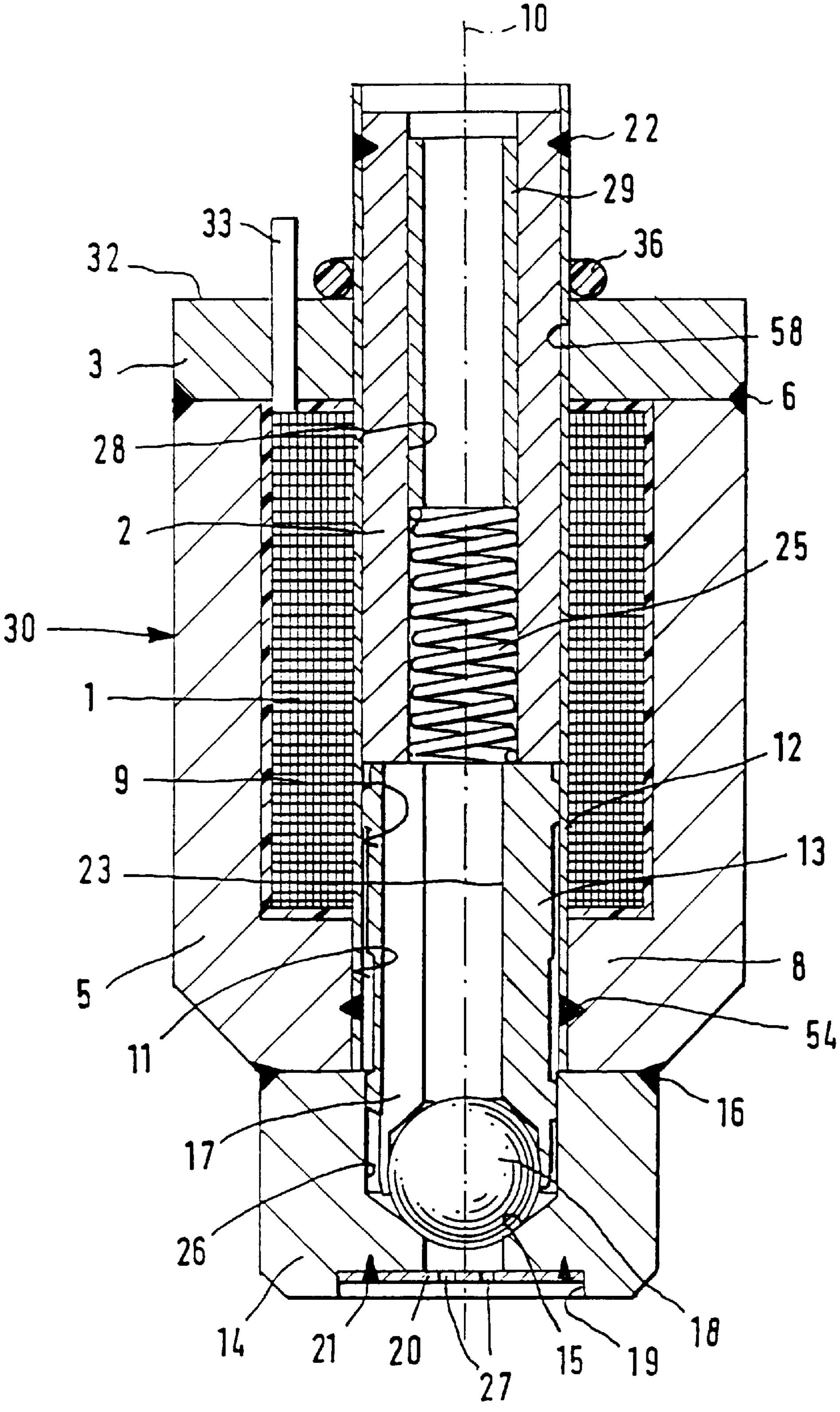
FIG. 1 shows an electromagnetically actuated valve according to the present invention.

The electromagnetically actuated valve of the present invention, shown in FIG. 1 in a simplified manner and for illustrative purposes, in the form of an injector for fuel injection systems in mixture-compressing internal combustion engines having externally supplied ignition, has a substantially tubular core 2 that is surrounded by solenoid coil 1 and functions as interior pole and partly as fuel passage. Together with an upper, disk-shaped cover element 3, core 2 permits a particularly compact construction of the injector in the area of solenoid coil 1. Solenoid coil 1 is surrounded by an external, ferromagnetic valve sleeve 5 as the external pole, which completely surrounds solenoid coil 1 in the circumferential direction and is fixedly joined at its upper end to cover element 3, e.g., by a weld 6. To close the magnetic circuit, valve sleeve 5 is executed in steps at its lower end so that a guide section 8 is formed, which, like cover element 3, axially surrounds solenoid coil 1 and which represents the boundary of solenoid coil area 1 in the downward, or downstream, direction.

Guide section 8 of valve sleeve 5, solenoid coil 1, and cover element 3 form an interior opening 11 or 58, running concentric to a longitudinal axis 10 of the valve, an elongated sleeve 12 extending in the opening. An interior longitudinal opening 9 of ferritic sleeve 12 functions partly as a guide opening for a valve needle 13 that is axially movable along longitudinal axis 10 of the valve. Sleeve 12 is therefore precisely manufactured with respect to the inner diameter of interior opening 9. Seen in the downstream direction, sleeve 12 ends in the area of guide section 8 of valve sleeve 5, to which it is fixedly joined, e.g., by a weld 54. In addition to the axially movable valve needle 13, stationary core 2 is also arranged on longitudinal opening 9 of sleeve 12. Sleeve 12 guides armature 17, and receives core 2, respectively, and it also fulfills a sealing function, so that in the injector a dry solenoid coil 1 is present. This is also brought about by disk-shaped cover element 3 covering solenoid coil 1 completely at the coil's upper side. Interior opening 58 in cover element 3 makes it possible to configure sleeve 12, and thus also core 2, in lengthened form so that both components, extending beyond opening 58, stick out over cover element 3.

At lower guide section 8 of valve sleeve 5, a valve seat body 14 is attached, which has a fixed valve seat surface 15 as a valve seat. Valve seat body 14 is fixedly joined to valve sleeve 5 by a second weld 16, for example, as produced by a laser. Valve needle 13 is formed by a tubular armature 17 and a spherical valve-closure member 18, armature 17 functioning directly as a closing-member support. At the downstream front end of valve seat body 14, e.g., in a depression 19, a planar spray-orifice plate 20 is arranged, the fixed connection of valve seat body 14 and spray-orifice plate 20 being realized, e.g., by a circumferential, sealing weld 21. Tubular armature 17, at its downstream end, facing spray-orifice plate 20, is fixedly joined to spherical valve-closure member 18, e.g., by means of flanging, provision being made in the connecting area for grooves or channels, so that fuel flowing through armature 17 in an interior longitudinal bore 23 can exit to the outside and flow directly in valve-closure member 18 down to valve seat surface 15.

The injector is actuated electromagnetically, in the known manner. For axially moving valve needle 13 and thus for opening or closing the injector against the spring tension of a resetting spring 25, the electromagnetic circuit acts using solenoid coil 1, interior core 2, exterior valve sleeve 5 and armature 17. Armature 17 in its end facing away from valve-closure member 18 is aligned with core 2.

Spherical valve-closure member 18 cooperates with valve seat surface 15 of valve seal body 14, valve seat surface 15 tapering to a truncated-cone shape in the flow direction, and being configured, in the axial direction, downstream of a guide opening 26 in valve seat body 14. Spray-discharge plate 20 has at least one, possibly four spray-discharge openings 27, which are formed by eroding or stamping.

The insertion depth of core 2 in the injector is decisive, inter alia, for the stroke range of valve needle 13. In this context, the one end position of valve needle 13 is determined, when solenoid coil 1 is not excited, through the contact made by valve-closure member 18 at valve seat surface 15 of valve seat body 14, whereas the other end position of valve needle 13, when solenoid coil 1 is excited, is determined by the contact of armature 17 at the downstream end of core 2. The stroke range is set by axially sliding core 2 in sleeve 12, core 2 then being fixedly joined to sleeve 12 at the desired position, laser welding being expedient for producing a weld 22.

In addition to resetting spring 25, an insertion sleeve 29 is inserted into a flow hole 28 of core 2, running concentric to longitudinal axis 10 of the valve, the flow hole functioning to supply fuel in the direction of valve seat surface 15. Insertion sleeve 29 acts to set the resilience of resetting spring 25 abutting against insertion sleeve 29, resetting spring 25 for its part resting with its opposite side on armature 17, the dynamic spray-discharge quantity being also set by insertion sleeve 29.

An injector of this type is distinguished by its compact design so that a very small, manageable injector is created, whose valve sleeve 5 has an external diameter of, e.g., only approx. 11 mm. The components described above make up one preassembled independent assembly, which can be referred to as a functional part 30. The completely installed and assembled functional part 30 has, e.g., an upper end face 32, beyond which extend, e.g., two contact pins 33. The electrical contacting and thus the excitation of solenoid coil 1 occurs via electrical contact pins 33, which function as electrical connecting elements.

An undepicted terminal part can be joined to a functional part 30 of this type, the terminal part being distinguished above all by its encompassing the electrical and the hydraulic connection of the injector. In a completely assembled injector, a hydraulic connection of the undepicted terminal part to functional part 30 is achieved by the flow holes of both assemblies being brought into position regarding each other such that an unhindered fuel flow-through is assured. In this context, for example, end face 32 of functional part 30 directly contacts one lower end face of the terminal part and is fixedly joined to it. In mounting the terminal part on functional part 30, the part of core 2 and sleeve 12 protruding beyond end face 32 can extend into a flow hole of the terminal part to increase the stability of the connection. In the connecting area, to achieve a secure seal, provision is made, e.g., for a sealing ring 36, which encompasses sleeve 12, resting on end face 32 of cover element 3. In the completely assembled valve, contact pins 33, functioning as electrical connecting elements, have a reliable electrical connection to the corresponding electrical connecting elements of the terminal part.

Figure 2:
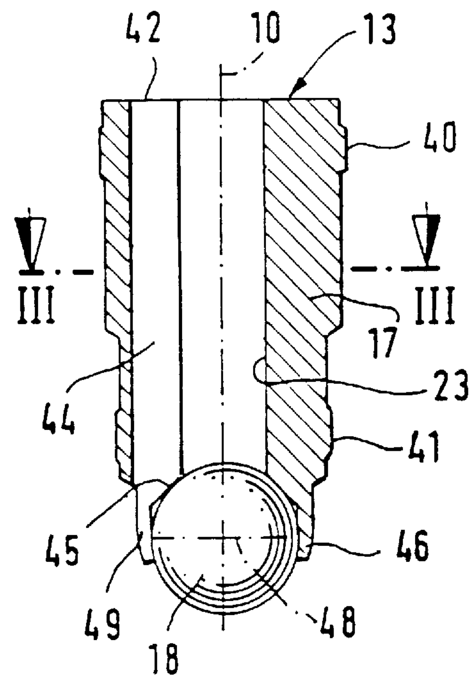
FIG. 2 shows a first exemplary embodiment of valve needle.

FIG. 2 shows valve needle 13 in dimensions, enlarged in comparison with its illustration in FIG. 1. Tubular armature 17 is executed as a lathed part, which has a multi-step external contour. Formed on the external periphery of armature 17 are, e.g., two annular guide surfaces 40 and 41, which, on the one hand, function to support axially movable valve needle 13 in sleeve 12, and, on the other hand, in valve seat body 14. Armature 17, which is made, e.g., from a ferritic metal (chromium steel), has an upper stop face 42, facing core 2, which is furnished with a protective sealing layer, e.g., chrome.

Inner longitudinal bore 23 in armature 17 has a substantially circular cross section, which, however, is interrupted, e.g., every 120° in circumference, since three flow paths 44 extend out from it. In this context, flow paths 44, which may be formed through broaching, run over the entire axial length of armature 17. The profiled interior contour of armature 17 can be produced by means of so-called interior broaching, the broach (e.g., a scraping tool) having a plurality of layered cutters and executing a linear cutting motion in the longitudinal bore 23. Interior longitudinal bore 23 has a conical shoulder 45 at its lower end, facing toward valve-closure member 18, longitudinal bore 23 widening through conical shoulder 45 in the downstream direction and conical shoulder 45 functioning as limit stop for valve-closure member 18. From shoulder 45, an end area 46 of armature 17 extends along the external periphery of spherical valve-closure member 18, flow paths 44 ensuring the corresponding interruptions also in end area 46.

Figure 3:
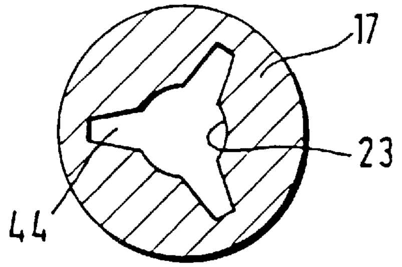
FIG. 3 shows a cross section of the valve needle illustrated in FIG. 2 along line III—III.

Spherical valve-closure member 18 has, running perpendicular to valve longitudinal axis 10, a sphere equator 48, to which or beyond which end area 46 extends in the downstream direction. Expressed in other terms, at least one hemisphere, and thus the radius of spherical valve-closure member 18, is encompassed by armature 17. End area 46 has a greater external diameter than valve-closure member 18. The fixed connection between armature 17 acting as closing-member support and valve-closure member 18 is achieved, e.g., through flanging or pressing, or through pressing-in followed by flanging, the encompassing area downstream of sphere equator 48 assuring above all a reliable connection. Flow paths 44 of longitudinal bore 23, in the area of valve-closure member 18, pass over into narrow channels 49 that are open toward the periphery of end area 46, narrow channels 49 conveying the fuel in the direction of valve seat surface 15, the fuel being fed in longitudinal bore 23 and flowing across the sphere surface. These channels 49 are formed, for example, by the same broaching process as flow paths 44. This design of valve needle 13 permits a very simple inflow of fuel to the dosing area of the injector. FIG. 3 is a sectional view of a cross section along line III—III in FIG. 2. It mainly clarifies the contour of interior longitudinal bore 23 in armature 17 with its three flow paths 44, each formed at 120°, running radially toward the outside.

Figure 4:
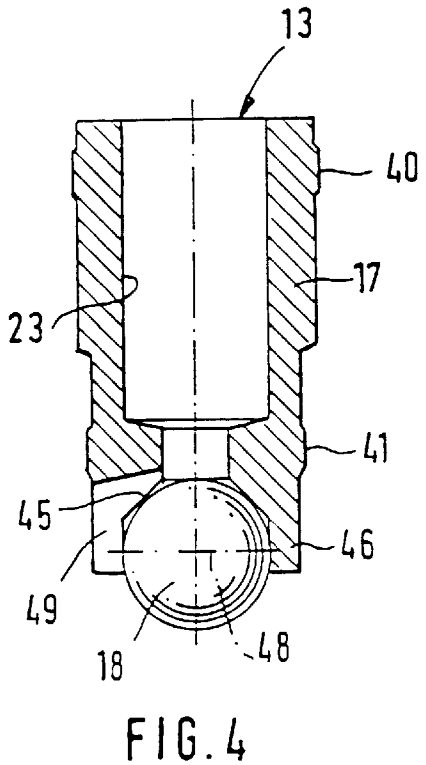
FIG. 4 shows a second exemplary embodiment of the valve needle.

In FIG. 4, a second exemplary embodiment of a valve needle 13 is shown in which the same or similar parts as those illustrated in the exemplary embodiment in FIG. 2, are designated with the same reference numerals. Valve needle 13 shown in FIG. 4 is distinguished by a somewhat differently shaped interior longitudinal bore 23. Armature 17, here in the form of a cold-pressed part, has a stepped longitudinal bore 23, which has an entirely circular cross section. At the external periphery of the armature, provision is made for guide surfaces 40 and 41, which help to guide valve needle 13. Similarly, end area 46 of armature 17 extends beyond the sphere equator 48 of valve-closure member 18 in the downstream direction. Beginning in the area of shoulder 45, in end area 46 at least one, e.g., three grooves or channels 49 are formed, which, proceeding from longitudinal bore 23, have an axial extension component and permit fuel to flow through in the direction of valve seat surface 15. Spherical valve-closure member 18 is, for example, pressed into longitudinal bore 23 of armature 17 and/or is secured in end area 46 by flanging.

Figure 5:
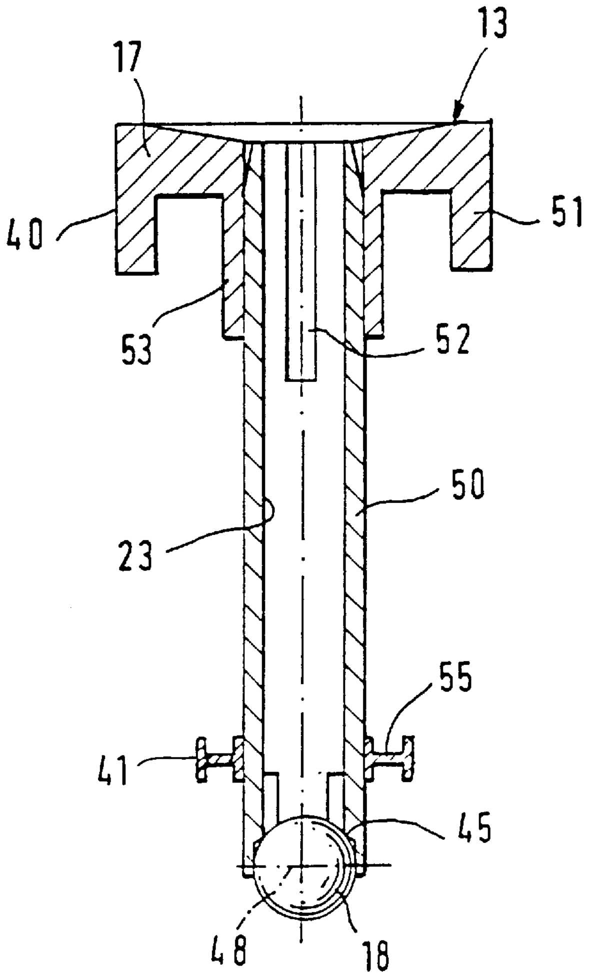
FIG. 5 shows a third exemplary embodiment of the valve needle.

Another exemplary embodiment of a valve needle 13 is shown in FIG. 5. In this exemplary embodiment of valve needle 13, armature 17 and valve-closure member 18 are joined to each other via a sleeve-shaped connecting part 50. In this context, all connections at valve needle 13 are realized through a non-integral jointing process. Ferritic armature 17, which, for example, represents an extruded part, is, e.g., pressed onto the upstream end of connecting part 50 having a central retaining area 53. An upper annular guide surface 40 for guiding valve needle 13 in its axial movements results from armature 17 being formed having a dimensionally accurate annular limb 51. In the area connecting to armature 17, for example, the likewise extruded, but austenitic connecting part 50 is provided with at least one axially extending, slot-shaped cut-out 52, by means of which the mounting of armature 17 on connecting part 50 is improved.

At the downstream end of connecting part 50, a guide ring 55 is pressed onto the external periphery of connecting part 50, the guide ring, with an H-shaped cross section, having lower guide surface 41 at its external periphery. As described above, spherical valve-closure member 18 is again fixedly joined by pressing in or flanging, but here not into armature 17, but rather into connecting part 50, which now acts as closing-member support. The grooves or channels 49 necessary for the passage of the fuel, during the extruding of connecting part 50, are cut out once or multiple times in a very simple manner. Spherical valve-closure member 18 is brought as far as possible into the downstream end of longitudinal bore 23 which supplies the fuel, a conical shoulder 45 acting again as a limit stop. The grooves or channels 49 or cut-outs 52, advantageously, do not have to be filleted during the extruding of connecting part 50. For the rest of the components, no deburring at valve-closure member 18 is necessary for the passage of the fuel, since the fuel, coming from longitudinal bore 23, can flow unhindered along the surface of valve-closure member 18 through channels 49.

In addition to the formation of closing-member support 17, 50 as lathed or cold-press part, designs as sintered or MIM (Metal Injection Molding) parts are also possible.

What is claims:

1. An electromagnetically actuated valve having a longitudinal valve axis, comprising:

a core;

a solenoid coil at least partially surrounding the core;

a stationary valve seat; and an axially movable valve needle including a closing-member support and a spherical valve-closure member, the spherical valve-closure member being fixedly joined to the closing-member support and cooperating with the stationary valve seat, the closing-member support having an inner longitudinal bore extending to a surface of the spherical valve-closure member, and a downstream end area having an external diameter which is greater than a diameter of the spherical valve-closure member, the closing-member support surrounding the spherical valve-closure member with the downstream end area to form at least one channel extending along a surface of the spherical valve-closure member, the at least one channel including an axially elongated portion and being connected to the inner longitudinal bore, the at least one channel extending to an end portion of the downstream end area and at least to a sphere equator of the spherical valve-closure member in a downstream direction.

2. The electromagnetically actuated valve according to claim 1, wherein the spherical valve-closure member is pressed into the downstream end area of the closing-member support to secure the spherical valve-closure member in the inner longitudinal bore.

3. The electromagnetically actuated valve according to claim 1, wherein the spherical valve-closure member forms an edge in the downstream end area of the at least one closing-member support to secure the spherical valve-closure member in the inner longitudinal bore.

4. The electromagnetically actuated valve according to claim 1, wherein the closing-member support includes an armature.

5. The electromagnetically actuated valve according to claim 1, further comprising:

an armature, the at least one closing-member support including a connecting part which is connected to the armature and to the spherical valve-closure member.

6. The electromagnetically actuated valve according to claim 1, wherein the closing-member support includes a shoulder portion in the inner longitudinal bore, the shoulder portion being a limit stop for the spherical valve-closure member.

7. The electromagnetically actuated valve according to claim 4, wherein the armature includes the inner longitudinal bore and the at least one channel, the inner longitudinal bore having a plurality of flow paths, the flow paths extending directly into the at least one channel of the armature in an axial direction.

8. The electromagnetically actuated valve according to claim 7, wherein the flow paths and the at least one channel are formed in the armature by a broaching procedure.

9. The electromagnetically actuated valve according to claim 1, wherein the at least one channel includes three channels.

10. The electromagnetically actuated valve according to claim 1, wherein the at least one closing-member support includes one of a lathed part and a cold-press part.

11. The electromagnetically actuated valve according to claim 1, wherein the at least one closing-member support includes one of a sintered part and a metal injection molding part.

12. The electromagnetically actuated valve according to claim 1, wherein the electromagnetically actuated valve includes an injector for a fuel injection system of an internal combustion engine.

* * * * *